March 3, 1959 J. O'D. SHEPHERD 2,876,343

ADJUSTABLE SEQUENTIAL PROGRAM CONTROLLER

Filed March 12, 1954 2 Sheets-Sheet 1

INVENTOR.

Judson O'D Shepherd

ADJUSTABLE SEQUENTIAL PROGRAM CONTROLLER

Filed March 12, 1954

INVENTOR.

Judson O'D Shepherd

United States Patent Office 2,876,343

Patented Mar. 3, 1959

2,876,343

ADJUSTABLE SEQUENTIAL PROGRAM CONTROLLER

Judson O'D. Shepherd, Atlanta, Ga.; Margaret F. Shepherd, executrix of said Judson O'D. Shepherd, deceased Application March 12, 1954, Serial No. 415,879

16 Claims. (Cl. 250—20)

This invention is directed to improvements in circuit controllers of the program type. The principal embodiment as disclosed herein is directed to a program controller for the preselection of broadcast programs for television, radio or the like, and for record selection with magazine type phonographs and the like, and is a continuation-in-part of my co-pending application Serial No. 193,197, filed October 31, 1950, now abandoned, which in turn is a continuation-in-part of my application Serial No. 48,045, filed September 7, 1948, now Patent No. 2,610,239, dated September 9, 1952, which in turn is a continuation-in-part of my application Serial No. 357,022, filed September 16, 1940, now Patent No. 2,451,457, dated October 12, 1948.

A feature of this controller as applied to television or radio sets is that the disclosed arrangements permit the pre-selection of a plurality of programs over a period of time. That is, it permits the user with a set so equipped to determine which programs he wishes to see or hear over a period of time. In the present disclosure this period is assumed to be three hours and the program changes will occur on each half hour, although the numver of intervals may be either greater or smaller as desired. For facility in describing the invention, it will be assumed that it is applied to a television set, although it is to be understood that the invention is not so limited.

With the disclosed device, the viewer at the beginning of a series of programs which he desires to view, will take a schedule of programs as from a newspaper or the like, and will preselect those programs he wishes and at the time he desires to view them; that is, what stations he wants at the time he wants them.

From the viewpoint of the operator, there is a tuning dial which is manually rotated for station selection, or automatically rotated in accordance with the present invention. This dial carries indicia indicating the station or channel allocation. It contains narrow slots for each station index in which are inserted longitudinally positionable keys which normally are fully inserted in the dial and, therefore, ineffective. These keys (with one exception to be described) can be individually pulled out to any one of six longitudinal positions corresponding to any one of six particular 30-minute intervals. For example, at the beginning of the third half-hour ahead, the operator may select the station corresponding to, say, channel 5 and pull out the channel 5 key to the position corresponding to half-hour three which, with the other five half-hours, are marked on the side of each key. This permits, by simple means from the viewer's standpoint, the selection of any desired station to come on at the beginning of any half-hour he desires within the limit of the device.

Another feature of the invention is to permit the selective turning off of the set at the end of any 30-minute interval. That is, if he wishes to cut off the set after four 30-minute intervals, he positions a special key designated "S" (stop) to its longitudinal position designated five. The desired preceding selected programs will be tuned in in order and when the fifth half-hour occurs, the set will automatically cut itself off.

Still another feature is that the set will automatically cut itself off after the six half-hour intervals have been exhausted.

An additional feature is that when the set is automatically changing from one station to another in accordance with the preset program, both the audio and picture will be temporarily discontinued or quenched until the desired station is reached.

A further feature is arrangements whereby a particular program may be continuously viewed over successive half-hours by the simple expedient of not positioning any key for the next (or several) successive half-hours. That is, a particular station will remain tuned in until a key is effective for a different station for a successive half-hour, whereupon the set will at that time change to the new station.

The principle of such selections by keys inserted in a rotating dial is disclosed in my copending application Serial No. 193,197, filed October 31, 1950, and other applications mentioned therein.

An additional feature is the operation of this set for a series of programs under control of the broadcasting stations.

Other features of the invention will be understood from the specification and drawings comprising two sheets of five figures, as follows.

Figure 2:
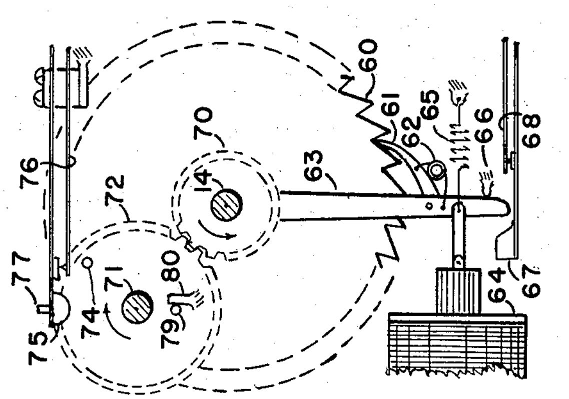
Figure 2 is a right-hand view of Figure 1 substantially along the section designated 2—2.
Figure 1:
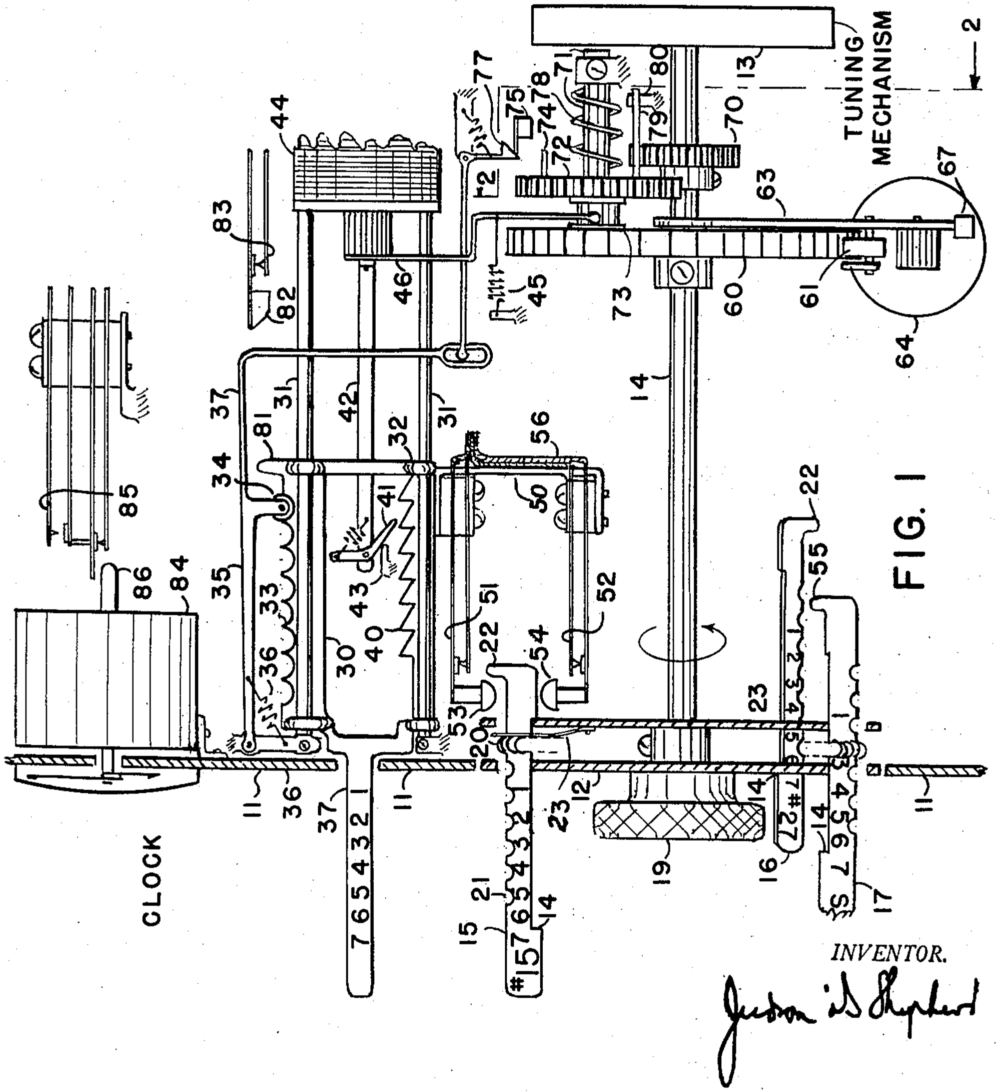
Figure 1 is a side view of the mechanism with the framework omitted, and partly in section.

In Figures 1 and 2, the frame upon which the various elements are mounted has been omitted and kinematic representations of said frame, where significant for the understanding of the invention, have been used.

With reference to Figure 1, the face of the set 11 (shown in section) has a circular portion cut out and through this cut out portion projects dial 12 (also in section) connected to conventional tuning means 13 by shaft 14. The dial has on its face indicia designating the station or channel which is tuned in according to the position of the dial. It is assumed that there will be a station to be tuned in at each of a plurality of equally spaced locations on the dial, with the exception of one position for controlling the automatic turning off of the set, as will be explained. Opposite each indicia is a longitudinally positionable key in a slot in the dial. Only two of the plurality of station selecting keys are shown, designated 15 and 16. The control of selective cutting off of the set automatically is effected by key 17, which is labeled "S" (stop).

Figure 3:
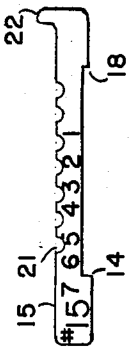
Figure 3 shows the details of a station selection key.

Figure 3 shows a typical station or channel selector key such as 15 and 16 of Figure 1. It has stamped or otherwise printed on its left hand end the channel number, here indicated as No. 15 for this specimen key. It also carries along its side position numbers indicating the longitudinal locations of each key in the dial for selecting any one of six successive half-hours for which programs or channels may be selected. If key No. 15 is inserted in position No. 1 (first half-hour) in the dial, when that half-hour arrives the dial will be automatically rotated to tune in channel No. 15. If the key for channel No. 27 is inserted to position No. 4 (fourth half-hour) that channel will be tuned in at the beginning of that time interval. Six channels can, therefore, be preselected as desired over six successive half-hours. Position No. 7 is provided to indicate that a key is fully inserted in the dial and out of the way of the internal mechanism. The keys will normally be in position No. 7 and will be pulled out to the desired half-hour interval as shown by the indicia on each key to preselect the desired timing of each selected program or channel.

A shoulder 14 is provided toward the left hand or head end of the key. This tends to prevent the key from inadvertently being pushed too far into the dial, since this shoulder will strike the outside of the dial when said key is in position No. 7. Likewise, there is another shoulder 18 near the right hand end of the key which strikes the inside of the dial and, therefore, tends to prevent the key inadvertently being pulled out beyond position No. 1. Key 15 of Figure 1 is shown in position No. 1. Scallops such as 21 are provided along the top edge of the keys to hold the keys in the position they are manually placed, as will be explained. At the upper right-hand end of each channel selecting key is a shoulder 22 to engage a contact actuating cam, as will be understood from what follows.

The dial 12 has a front and back portion affixed to shaft 14. This is for the purpose of giving rigidity to the keys in whatever locations they may be longitudinally positioned. A tightly wound spring 20 cooperating with scallops 21 holds the keys where they have been positioned. The spring 20 normally prevents longitudinal movement of the keys, but is in such tension as to permit the manual sliding of them for desired selections. The spring 20 is maintained centered between the two dial plates by a plurality of brackets 23 mounted on both the front and rear dial plates.

Key 15 is in the longitudinal position to make a station selection at the beginning of the next half-hour, i. e., the first half-hour for which a program has been set up. A program may be set up at, say, 6:45 for the next three hours. When 7 o'clock comes the key 15 will cause the station to be tuned in corresponding to the slot in which the key is located. It is immaterial what station, if any, has been manually tuned in at 6:45 p. m. when the program is set up.

Key 15 and the remainder of the keys revolve with the dial, whether the dial is manually rotated by knurled knob 19 or automatically driven as will be described.

A carriage 30 is slidably mounted on two rods 31 forming a cross-head guide. The carriage has bearings such as 32 for sliding motion on said rods. The upper edge of the carriage 30 has a scalloped edge 33 with a roller 34 mounted on a pivoted lever 35 sprung toward the carriage by spring 36, thereby to hold carriage 30 in a position to which it may be moved. The carriage 30 has an extension or handle 37 whereby it may be manually positioned, said handle carrying numbers to indicate visually the position which it may be occupying at any time.

The carriage is internally cut away and the lower edge of this cut-away position has a plurality of teeth 40 engageable by pawl 41 pivotably mounted on rod 42. This pawl is sprung toward the teeth but normally is prevented from engaging these teeth by fixed member 43. This enables the carriage to be manually positioned in either direction while being free of the pawl.

A magnet or solenoid 44 has its armature connected to rod 42 and when it is energized pulls this rod and, therefore, the pawl 41 to the right. As the pawl moves, it slides off of the fixed number 43 and engages a tooth on the carriage causing the carriage to be moved one position to the right. The armature of solenoid 44 and its attachments are pulled to the left (its normal position) by means of spring 45 fixed at one end and connected to armature extension 46.

Carriage 30 carries a bracket 50 upon which are mounted two spring assemblies 51 and 52 of normally closed contacts. Spring assembly 51 has a cam head 53 adapted to be engaged by shoulder 22 (if it is of a key such as 15 in the proper position) as the dial and keys rotate. The cam head, when engaged by a key shoulder such as 22, will open contacts 51. The head is so shaped that it not only can be raised by a key shoulder encountering it as the dial is rotated but will slide over any shoulder which may be in the way when the carriage is moved manually. By closure of clock contacts to be described, the solenoid 44 is energized to advance the carriage one step to the right each thirty minutes.

Contacts 52 with their cam 54 is for control of the cutting-off of the set automatically at the end of any desired half-hour of the program. A single key 17 is for the purpose of controlling this cutting off and the time of this occurrence is controlled by the distance key 17 is inserted in the slot. It is shown in position number four. Consequently, when the carriage has been advanced to position four and the dial is rotated, shoulder 55 will engage cam 54 to result in contacts 52 being opened and, as will be understood from the circuit diagram to be explained later, will cause the set to be cut off. A small bundle of flexible conductors 56 extends the contact circuits from the carriage bracket 50 to fixed elements of the device.

In the functioning of the device, contacts 85 of an electric clock 84 will be operated for two or three seconds on the hour and half-hour by the upward movement of clock actuated lever 86. A circuit from the upper pair of these contacts is connected to a motor or a solenoid 64 with a ratchet drive to rotate the dial and keys, as will be described. These upper contacts also energize solenoid 44, causing the carriage to be advanced a step to the right each half-hour. Let it be assumed that this is the beginning of the first half-hour of the program, and key 15 has its shoulder in the first position, as shown. Assume, for the moment, that the dial is tuned to some other station, and key 15 is, therefore, in some other position around the dial than that shown. As the dial is rotated by its motor or "motoring" solenoid, key 15 will be rotated with it. Since the carriage 30 is now in position No. 1, shoulder 22 of key 15 will engage cam 53 to cause contacts 51 to be opened, to open the circuit to the motor or "motoring" solenoid, causing the dial to stop with key 15 in the position shown except that it is now holding open contacts 51. The slot in which key 15 is located determines the station tuned in. Only one key in the dial will ever be located for its shoulder to engage cam 53 for any position of carriage 30, and only one of the several keys will have its shoulder in any one of the other five operating positions. It will be seen that the principle here considered involves, at each thirty minutes, the dial being driven upwards of one revolution with cam 53 seeking a key shoulder such as 22 to stop it in that position.

In the preferred embodiment, and as better shown by Figure 2, shaft 14 has a ratchet wheel 60 affixed to it. This wheel is stepped by means of pawl 61 tensioned toward the wheel by a spring 62. A lever 63, loosely pivoted on shaft 14, supports pawl 61. This lever is linked to the armature of solenoid 64. When the latter solenoid is energized it causes pawl 61 to be positioned on the next tooth of the ratchet wheel, and when the solenoid is deenergized, spring 65 causes the pawl to advance the ratchet wheel counter-clockwise one step. A stop 66 limits the travel of the lever. Preferably one step of the ratchet wheel will be the amount of rotation required to advance the dial from one channel to the next one.

I may provide a roller similar to 34 sprung against the teeth of ratchet wheel 60 to hold said wheel in the position to which it has been stepped.

When solenoid 64 is energized and attracts its armature, an extension of lever 63 encounters cam 67 and opens contacts 68 as the pawl is positioned on the next tooth of the ratchet wheel. Contacts 68 are in the operating circuit for solenoid 64, so upon opening of said contact the lever 63 will spring back and the ratchet wheel 60 will be advanced, as stated. The contacts 68 will again be closed and the operation will be repeated until the operating circuit for the solenoid is opened. This is the familiar "self-motoring" solenoid or magnet found in the telephone and related arts.

It is apparent that ratchet wheel 60 may be a gear wheel driven by a motor with minor changes in the arrangements and circuits as will be understood by those practiced in the art.

It was stated above that the automatic program control is effected by causing the dial to be rotated until a shoulder on a key in proper position encounters cam 53 to cause contacts 51 to be opened. If no key is properly positioned for the on-coming half-hour, the dial will be driven around and around until the circuit for solenoid 64 is opened by the clock contacts, if means are not provided to prevent it. Means are disclosed which prevents this occurrence and also arranges to cause the previous half-hour program to be continued if no key is encountered.

A gear 70 is affixed to shaft 14. A fixed shaft 71 is provided upon which is loosely mounted idler gear 72 adapted to mesh with gear 70. The teeth of these two gears are chamfered so that they will readily mesh when idler 72 is slid into engagement with gear 70. The armature extension 46 of solenoid 44 is extended and terminates in a fork operating in conjunction with a collar 73 attached to gear 72. It will be seen that as solenoid 44 operates it immediately causes gears 70 and 72 to mesh. As a result of this, gear 72 rotates with the rotation of shaft 14 and the dial 12. Gear 72 has a pin 74 on its side. The ratio of gears 70 and 72 is such that when the dial 12 makes precisely one revolution, pin 74 engages cam 75 of contacts 76, thereby opening said contacts. These contacts are in the operating circuit for solenoid 64, so the opening of these contacts will stop rotation of the dial exactly when it has made one full revolution. It will be seen that this will not only prevent the dial "running away" but will stop it in exactly the position it occupied before this operation started. If the viewer desires a program to continue through a succeeding half-hour, leaving all keys out of the position for that half-hour will result in the dial making a "searching" rotation and stopping on the station of the previous half-hour. A particular program can similarly be arranged to be continued for three or more successive half-hours by merely omitting locating a key in the positions for those half-hours.

When contacts 76 are opened, they are latched open by latch 77. The latter latch is linked to lever 35 of roller 34, so the contacts 76, after being operated as described, are maintained open until the carriage is advanced, at the next half-hour, thereby raising the roller and tripping latch 77. When solenoid 44 is deenergized and restores to normal it causes gear 72 to be disengaged from gear 70, and due to the action of spring 78, said gear 72 is restored to normal whereupon pin 79 thereon encounters fixed stop 80.

The carriage 30 has a projection 81 adapted to engage cam 82 when the carriage is stepped to position seven, the first half-hour beyond the program period of six half-hours. The raising of cam 82 by the carriage projection opens contacts 83. These contacts are in the power circuit of the set, so at the end of a three-hour program the set automatically cuts itself off.

Figure 4:
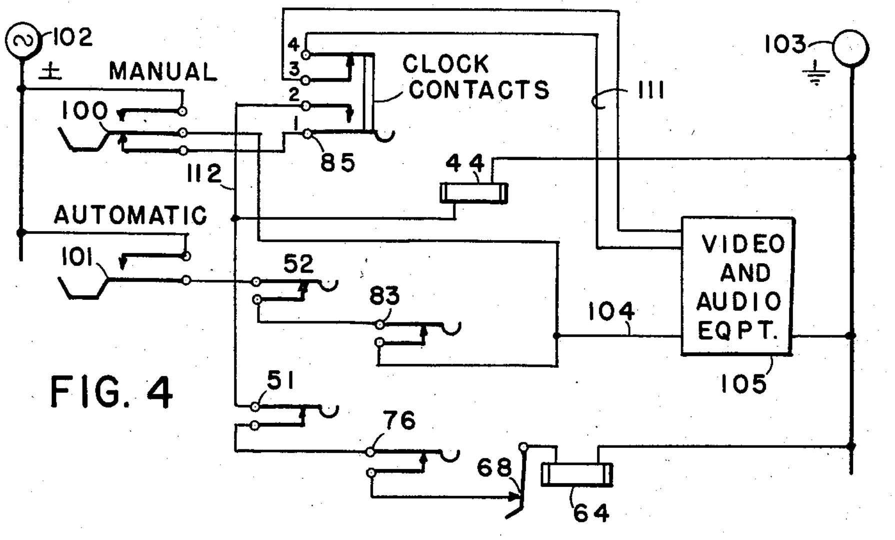
Figure 4 is a circuit schematic which may be employed with the primary embodiment of the invention.

A circuit schematic for this device is shown by Figure 4. The panel of the set contains two switches, one 100 may be labeled "Manual" for manual operation of the set while the other 101 may be labeled "Automatic" for preset program control. At the lower contact of manual switch 100 power supply for the elements for automatic operation is opened so that they will not be effective. With switch 101 (automatic) operated, power supply can be traced from power terminal 102, serially through contacts 52 which is opened by the single key 17 to turn the set off at a time during the program determined by the longitudinal position of said key, serially through contacts 83 which will be opened when the carriage is advanced to its seventh position indicating the present series of programs is terminated, to the video and audio equipment of the set via conductor 104 to the other power terminal 103. This will result in the set being turned on and it will remain on until contacts 52 or 83 are opened or, of course, until the set is turned off manually by releasing switch 101. The previously traced circuit is also extended from conductor 104 through the lower normal contact of switch 100 to contact No. 1 of clock contacts 85. These contacts are operated for about three seconds at each hour and half-hour. Let it be assumed that the keys have been positioned as desired at 15 minutes before the hour. When the hour comes the lower contacts Numbers 1 and 2 of 85 are closed and the upper ones, Numbers 3 and 4, are opened. The latter contacts are representative of any suitable circuit which will disable the picture tube and the audio equipment when an automatic station selection is being made. Since clock contacts 85 are operated while all automatic selections are being made, the controls effected by the upper members Numbers 3 and 4 of these contacts will preclude the disagreeable occurrence of the picture tube flashing and the loud speaker noisily picking up fragments of programs as the dial is rotated. The described power circuit from contact Number 2 of clock contacts 85 is extended to the winding of solenoid 44 and thence to the other power terminal 103, thereby causing this solenoid to operate and advance the carriage to its first position. A branch of the circuit from the Number 2 contacts 85 is also extended through normally closed key contacts 51, normally closed contacts 76 associated with gear 72, the back contacts 68 of solenoid 64, winding of said solenoid to the other power terminal, causing solenoid 64 repeatedly to operate and release, thereby turning shaft 14, dial 12 and the plurality of keys. This continues until contacts 51 are opened by a key such as 15 engaging cam 53, indicating that the desired station has been selected. The opening of contacts 51 obviously opens the circuit for solenoid 64, stopping the dial on the selected station. Had contacts 76 been opened, indicating that the dial has made a full revolution, the dial likewise will be stopped after having made precisely one revolution and latter said contacts will remain open until the carriage is moved. In practicing this invention, I may elect to provide a pair of normally open contacts in series with the circuit just described for solenoid 64, said contacts being closed by the operation of solenoid 44. It will be noted that if contacts 76 are opened by virtue of the dial making a complete revolution, latter said contacts will be latched open until the carriage is moved.

At the end of, say, 3 seconds contacts 85 are released by the clock mechanism and will restore to normal, thereby resulting in solenoid 44 restoring and unmeshing gears 72 and 70, permitting gear 72 to be sprung back to normal. At the beginning of the next 30 minutes the clock will again actuate contacts 85 to cause solenoid 44 to be energized and carriage 30 to be advanced to its next position. Contacts 51 will now be closed due to cam 53 being advanced off of key shoulder 22. By a previously described circuit, motoring solenoid 64 will again repeatedly operate and release thereby rotating the dial until cam 53 again encounters a key shoulder such as 22, whereupon it will stop. If it does not encounter a key shoulder, contacts 76 will be opened stopping the dial on the channel which was effective for the previous half-hour, as mentioned. This operation will be continued for subsequent half-hours until contacts 51 are opened by a key or until contacts 83 are opened when carriage 30 is advanced beyond position Number 6, whereupon the set will be cut off by the opening of contacts 83 in the power circuit 104 of the set.

Had it been elected automatically to turn off the set at a particular half-hour before carriage 30 has been advanced to its seventh position, the "stop" key 17 will be located in the longitudinal position (half-hour) designating when the set is to be turned off. No other key may properly be located in the same longitudinal position. Consequently, at the beginning of the half-hour when the set is to be turned off, the dial in rotating as described will cause the shoulder 55 on key 17 to encounter cam 54 which will open contacts 52. This will result in opening power conductor 104 and the set will be turned off.

Figure 5:
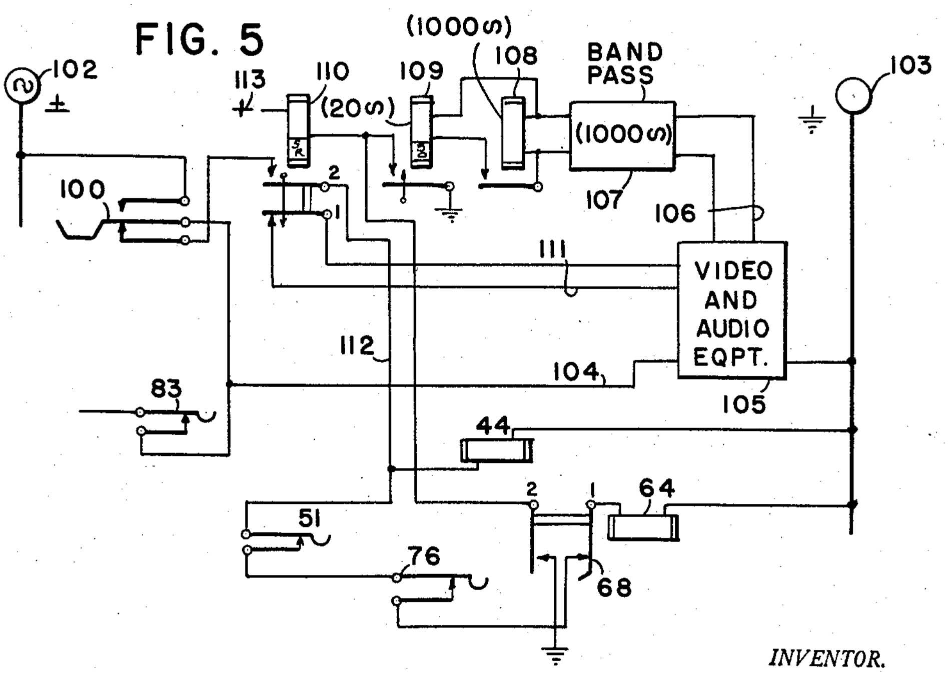
Figure 5 is an alternative circuit design whereby the successive program changes are effected under control of the broadcast stations.

Figure 5 is a modification of Figure 4 and discloses a circuit which may be used with the described invention whereby program changes are effected under control of the broadcast stations or the sources of the networks. This requires a distinctive audio signal to be broadcast. This signal comprises a sustained combination of two frequencies which would not normally be found for an appreciable length of time in either voice or in music. It is here assumed that it will be a 1,000 cycle frequency modulated 20 times a second, and this may be referred to as the "tone." This can be generated by a proper oscillator or the like, or by a whistle tuned to 1,000 cycles with a suitable pith ball or the like which will interrupt or modulate the 1,000 cycles 20 times a second. This tone will be transmitted for a few seconds. Any other appropriate pair of frequencies may be used as the tone. It is difficult to conceive of such a tone being sustained in the voice or in music, although it might momentarily occur for too short an interval to affect the automatic selective functions of the set.

From the audio portion of the set, conductors 106 extend to band pass filter 107 having the characteristic of passing 1,000 cycles. The output of this filter is connected to relay 108, which will operate in response to the filter supplying 1,000 cycle power to it. The operation of relay 108 will connect the output of the filter to the winding of relay 109 which has slow-to-operate characteristics and will be responsive to 20-cycle current. Only those elements of Figure 4 are shown by Figure 5 to tie the two figures together, since the operation of Figure 5 is identical with that of Figure 4, except contacts of relay 110 are substituted for clock contacts 85.

When relay 109 operates it will operate relay 110 from ground to a D. C. positive service of current in the audio portion of the set designated 113, said source, winding of relay 110, armature and contacts of relay 109 to ground, thereby operating relay 110. Relay 110 has slow-to-release characteristics. Relay 110 has contacts which correspond to those of clock contacts 85, and substantially the remainder of the circuit is identical with that of Figure 4. Contact Number 1 of relay 110 opens or suppresses the video or audio signal as did contacts Numbers 3 and 4, of clock contacts 85 of Figure 4. Contacts Number 2 of relay 110 supplies power to magnet 44 and via contacts 51 and 76 contacts Number 1 of stepping magnet 64, winding of said magnet to ground terminal 103, causing latter said magnet to operate as a vibrator to turn dial 12 and shift the channels as has been described. In the modification of Figure 5 additional contacts Number 2 are added to the armature and pawl of magnet 64. Each time magnet 64 operates it will extend a ground circuit through its contacts No. 2 to the winding of relay 110 to positive power 113 in the set. Consequently, when relay 109 is operated by receipt of 1,000 cycle current modulated twenty times a second, relay 110 operates and energizes magnet 64 which will operate as a vibrator and, with each operation will reenergize relay 110 so that when contacts Number 1 of relay 110 quenches the video and audio portion of the set, including the 1,000-20 cycle tone, relay 110 will be continuously operated by virtue of its slow-to-release characteristics and the fact that latter relay is reenergized upon each operation of magnet 64, so that when said tone is received for a sufficient length of time relay 110 will be operated as a result of said tone and subsequently by the repeated operation of magnet 64. The suspension of operation of relay 109 by the quenching of the audio signal including the tone will not affect relay 110 since it will be maintained operated by repeated operation of magnet 64 until contacts 51 are opened by a new channel being selected or by contacts 76 being opened indicating the dial has been driven through one revolution, whereupon magnet 64 will remain normal and relay 110 will be released after a short interval. It will be recognized that since the circuit of Figure 5 is energized under control of the broadcasting station, the intervals between the change in channels may also be controlled by the broadcasting station and the 30-minute intervals assumed in the primary embodiment will no longer control. That is, the set will progress from one channel to the next each time the set receives the tone, and the broadcasting station will transmit the tone at the end of each program, whether the program lasts 15 minutes, 30 minutes or an hour, or even longer.

Preferably the band pass filter will contain an amplifier so that the current from it which is supplied relays 108 and 109 will be D. C. modulated by the tone. Suitable networks may be provided to facilitate the operation of relay 108 in response to 1,000 cycle current and relay 109 in response to 20 cycles.

It will be recognized that it will be a requirement of the broadcasting station or the source of a network program to terminate each program with the tone, whether this occurs at the end of 15 minutes, 30 minutes, an hour or even longer. In the manual setting of the program selecting keys it will be done by programs rather than at fixed intervals of time as contemplated with respect to Figure 4.

The arrangement for controlling the rotation of the dial to precisely one revolution which is shown to involve gears 70 and 72 is illustrative of any means to effect this result. An alternative scheme eliminates the use of these two gears. Instead of gear 70 a smooth face friction clutch can be mounted on shaft 14 and an annular smooth face clutch can be substituted for gear 72 and adapted to be brought into operative engagement with the first mentioned clutch member as a result of the operation of solenoid 44 by linkages, such as shown, which cause gear 72 to mesh with gear 70. The clutch plate corresponding to gear 72 will carry the contact actuating pin and the stop pin, and will have a spring corresponding to spring 78 to release the clutch plate corresponding to gear 72 and restore it to normal. It will be noted that with such an arrangement, clutch plate corresponding to gear 72 makes precisely one revolution per revolution of the dial. Its normal position will be that in which contacts 76 are open and after exactly one revolution these contacts will be opened again. But these contacts are in the circuit to solenoid 64, which requires that special means be provided to cause magnet 64 to operate to start during the dial with contacts 76 open. This may be very simply provided by the expedient of adding a pair of contacts controlled by lever 37, so that these contacts are momentarily closed each time the carriage is advanced a position which, as will be recalled, will occur at the beginning of each rotation of the dial. These contacts will be connected serially between the power supply and the winding of solenoid 64, so their momentary closing will cause the solenoid 64 to be operated and released, causing the dial and the clutch plate corresponding to gear 72 to be stepped one position whereupon contacts 68 will be opened and control will be restored to contacts 76, and the clutch plate will again open contacts 76 when it makes a complete revolution, stopping the dial on the same channel as it previously occupied before this operation took place. It will also be recalled that this condition arises when there is no key in the position where the dial is seeking a new channel indicating that the previous channel is to be continued.

This invention, as heretofore described, fails to provide one function which is quite desirable. It will be noted that a particular station, say, channel No. 5 can be set up for any half-hour interval, say, the first interval. This channel can be maintained for the succeeding half-hour or half-hours. But once it has been automatically tuned in and another station has subsequently been automatically tuned in, it is not feasible thereafter to go back to channel No. 5. This may be very simply cured in the following manner. Instead of a single key in each slot, double keys are provided, each such key in a slot being identical with the other. Normally both half-keys will be positioned together, but if it is desired for a particular station to be tuned in at different and not successive half-hour intervals, the double keys will be separately adjusted. If, for example, it is desired for channel Number 5 to be tuned in at, say, the second and fifth half-hour, one of the double keys in the slot for this channel will be set for the second half-hour and the other one of this pair will be positioned for the fifth half-hour. The set will then function as has been described, with channel Number 5 being tuned in for these particular intervals and other channels tuned in at the other intervals as desired. It will be recognized that channel Number 5 can be continued for the third as well as the second half-hour interval, and/or also for the sixth as well as the fifth interval, if desired. Double keys may also be employed to provide for the program of a single channel to be extended through a succeeding half-hour by having one of the pair positioned for the first of the two half-hours and the companion key for that channel positioned for the succeeding half-hour, thereby causing the same program to be continued for a full hour. Triple keys could, of course, be employed, if desired.

In any one location of a set there are relatively few stations, particularly of the TV or FM type, which may be reliably received, or in the practice of the listener are generally tuned in. The embodiments of the invention herein before described contemplate a key for every station available on the dial. In practicing this invention I may, on the contrary, provide keys in the dial for only those stations which are satisfactorily available or which are frequently tuned in. With such an arrangement I may elect readily to redesign the keys so that they may be inserted in the dial from the front thereof. All keys (except the stop one) may be identical so that the listener may set up for automatic selection only those stations he wishes to tune in from time to time. Some other obvious minor changes in design for insertion of keys from the front of the dial are also contemplated.

When this invention is applied to the selection of records with a magazine phonograph, clock contacts will be inappropriate, and the change in program (record) will be initiated by completion of the playing of the preceding record which will cause contacts similar to the clock contacts 85 to be actuated. Modification in the details of the mechanism will, of course, be required in light of the specific record selection and control which is employed with the phonograph.

This device has been described on the basis that dial 12 rotates. By modification of the mechanism the dial may be fixed and carriage 30 with its attachments may be attached to shaft 14 and rotated therewith. The important point is that there must be relative rotation between carriage 30 and the dial. In claiming this invention I shall refer to a rotating dial, but it will be understood that this is to be considered as a relative term and is intended to cover the alternative of having carriage 30 as the rotating member.

In claiming this invention I may use certain terms which may be appropriately set out for clarity. A "program" is intended to designate a TV channel or a station. "Sequence" is intended to mean the order of programs which is set up by longitudinal locations of keys in the dial. "Position" is primarily related to the location of carriage 30 for the successive half-hours or, where station changes are under control of the broadcasting stations or network sources, position designates each of the positions of carriage 30 for successive programs.

While I have described my invention and means for utilizing the same in connection with television and radio sets, and magazine phonographs, it is to be understood that various other applications and embodiments may be made by those skilled in the arts without departing from the spirit of the invention as defined within the scope of the appended claims.

What is claimed is:

1. In a program controller including a rotatable program selecting dial, key receiving slots in said dial each designating a channel, longitudinally positionable keys in said dial to adjustably preselect a sequence of channels, contact mechanism variably actuatable by said keys dependent upon the longitudinal position of said keys and the particular slots in which said keys are adjustably positioned and means to rotate said dial under control of said contact mechanism to select channels in accordance with said sequence.

2. In a program controller, including a program selecting dial provided with circularly disposed radial key receiving slots each designating a channel, keys in said slots adjustably positionable longitudinally to preselect a desired sequence of channels, means to rotate said dial, contact mechanism actuatable by said keys to control the rotation of said dial, means to cause said dial rotating means to rotate said dial in response to the periodical completion of an electrical circuit and means to stop the rotation of said dial under control of said keys to select the next channel in the sequence.

3. In a program controller, a rotatable program selecting dial provided with circularly arranged key receiving slots each designating a channel, keys longitudinally positionable in said slots, means to rotate said dial to predetermined positions each tuning in a predetermined channel and means to control said dial rotating means by said keys to stop said dial at a particular position dependent upon the longitudinal location of a key in said dial at the corresponding position.

4. In a program controller to sequentially select a plurality of predetermined programs including a program selecting dial provided with circularly arranged key receiving slots, said slots designating positions in which said dial may be stopped to effect program selections, longitudinally positionable keys in said slots, the relative longitudinal position to which said keys are positioned predetermining a desired sequence of programs, means to rotate said dial, periodically actuated electrical circuit closing means operatively connected to said dial rotating means to actuate said dial rotating means to periodically rotate said dial to select the succeeding program in the sequence, and means to stop said dial at the position corresponding to said succeeding program under control of a key in a relative longitudinal position in the slot designating said succeeding program.

5. In a program controller to select programs in a sequence of predetermined programs, a program selecting dial provided with radial key receiving slots which are circularly arranged, said slots designating positions in which said dial may be stopped to effect program selections, means to rotate said dial, chronologically actuatable means to actuate said dial rotating means to rotate said dial to select the succeeding program in a sequence, and means to stop said dial at the position corresponding to said succeeding program under control of a key in the slot, said key occupying a predetermined longitudinal position in said slot to designate the sequence position of its corresponding program.

6. A sequential preselection program controller for a television set or the like, including a tuning dial for selecting programs, said dial containing circularly arranged radial key receiving slots, each designating a program which may be tuned in, longitudinally positionable keys in said slots with the relative longitudinal positions of sad keys designating a desired sequence of said programs, chronologically operated electrical contacts, means to rotate said dial, means including electrical contacts engageable by said keys responsive to the operation of said chronologically operated contacts to control said rotating means to rotate said dial to the next program of the sequence predetermined by a key in a particular longitudinal position in the slot corresponding to said next program.

7. A preselection sequential program selector for television sets or the like including a rotatable dial for program selection, key receiving slots circularly arranged in said dial at locations corresponding to channels which may be selected by said dial, keys in said slots, said keys being longitudinally adjustable to any of a plurality of positions, each of said positions representing one of a sequence of desired channels, electrically operated means to rotate said dial, contacts actuatable by said keys in a circuit to control said dial rotating means, means to drive said contacts to successive positions, said positions corresponding successively to the sequence of desired channels, means to actuate said contact driving means at a predetermined time on a channel to cause said contact driving means to advance said contacts to a location corresponding to the next channel of the sequence, and means to actuate said dial rotating means to rotate said dial to the succeeding channel at which it is stopped by a key in the slot for that channel and at a longitudinal position corresponding to the sequence position in which said contacts are then located.

8. In a preselection program selector in accordance with claim 7, wherein means are provided which operatively relate said means to drive said contacts to successive positions, with said electrically operated means to rotate said dial, to stop the dial on the channel which it occupied prior to a selective operation in the event no key is in the longitudinal sequence position for selecting a different channel.

9. A preselection sequential program controller for television sets or the like including a rotatable dial for program selection, key receiving slots circularly arranged in said dial at locations corresponding to channels which may be selected by said dial, keys in said slots, means to longitudinally adjust said keys to any of a plurality of positions, each of said positions representing one of the sequence of desired channels, chronologically operated electrical contacts, electrically operated means to rotate said dial, control contacts actuatable by said keys in a circuit to control said dial rotating means, means to drive said control contacts to successive positions, each position corresponding to a longitudinal position in which said keys may be positioned and each position of latter said contacts corresponding successively to the sequence of desired channels, means to actuate said contact driving means for latter said contacts in response to the operation of said chronologically operated contacts during a program on a channel to cause said contact driving means to advance said contacts to a location corresponding to the next selection and means to actuate said dial rotating means to rotate said dial to the succeeding channel at which it is stopped by a key in the slot for that channel and at a longitudinal position corresponding to the sequence position in which said contacts are then located.

10. In a preselection sequential program controller for a television set or the like including a rotatable program selecting dial, means to drive said dial, key receiving slots circularly arranged in said dial at locations corresponding to channels which may be selected by rotation of said dial, keys in said slots which may be longitudinally positioned to predetermine a desired sequence of channels, means receptive to the transmission of a combination of frequencies to the set at the conclusion of a program, and means responsive to said receptive means and said longitudinally positioned keys to actuate said dial driving means to rotate said dial to tune in the next channel of the sequence.

11. In a preselection sequential program controller for television sets or the like including means to transmit to the set from the broadcasting studio a combination of predetermined frequencies at the conclusion of each program, a tuning dial in said set containing a circularly arranged row of key receiving slots, each slot corresponding to a different channel which may be tuned in, longitudinally positionable keys in said slots, the relative longitudinal positions of said keys predetermining a desired sequence of channels to be tuned in, and means responsive to receipt by the set of said combination of frequencies to drive said dial to select successive channels of said sequence under control of the longitudinally positioned keys in said dial.

12. A sequential preselection program controller for a television set or the like, including a tuning dial for selecting programs, said dial containing circularly arranged key receiving slots, each designating a program which may be tuned in, longitudinally positionable keys in said slot with the relative longitudinal positions of said keys designating a sequence of said programs, chronologically actuated means to advance selection of successive programs in the sequence, means to rotate said dial, means responsive to said chronological means including electrical contacts engageable by said keys to control said rotating means to rotate said dial to the succeeding program predetermined by a key in the slot corresponding to said succeeding program and at a longitudinal position designating the particular order of that program in the sequence.

13. In a sequential adjustable program controller including a rotatable program selecting dial, a circularly arranged row of key receiving slots in said dial with each slot designating a program which may be selected when the dial is at a corresponding position, longitudinally positionable keys in said dial, the relative longitudinal positions occupied by said keys designating the order in a sequence of programs that the programs corresponding to the slots in which said keys are located will be selected, means to rotate said dial, detecting means which operatively cooperate with said keys as said dial is rotated, chronologically operated contact means when operated causes said dial to be rotated and means including said detecting means for controlling said dial rotating means to stop the rotation of said dial at a position corresponding to a key in a predetermined longitudinal position designating the succeeding program of the sequence.

14. In a sequential adjustable program controller in accordance with claim 14, wherein means are provided which operatively relate said chronologically operated contact means, with said means to rotate said dial, to stop the dial on the channel which is occupied prior to a selective operation in the event no key is in the longitudinal sequence position for selecting a different channel.

15. In a preselection program controller for television sets or the like including a tuning dial assembly for selecting programs, said dial assembly having a dial containing circularly arranged radial key receiving slots, each designating a channel which may be tuned in, longitudinally positionable keys in said slots with the relative longitudinal positions of the said keys designating a desired sequence of said channels, means to initiate rotation of said dial assembly, and sensing means cooperating with said dial assembly to control the rotation thereof, whereby said dial assembly is caused to be rotated to tune successively the channels in accordance with said sequence.

16. In a preselection program controller for television sets or the like as set forth in claim 15, means operatively relating said sensing means, with said means to initiate rotation, to prevent more than one revolution of said dial assembly during each selective operation in the event a programming key is omitted from the longitudinal position designating a different succeeding channel.

References Cited in the file of this patent

UNITED STATES PATENTS

| | | |
|---|---|---|
| 1,772,786 | Sokoloff | Aug. 12, 1930 |
| 1,977,330 | Weckler | Oct. 16, 1934 |
| 2,004,324 | Heeren | June 11, 1935 |
| 2,010,826 | Pernod | Aug. 13, 1935 |
| 2,045,251 | Raber | June 23, 1936 |
| 2,057,294 | Duling | Oct. 13, 1936 |
| 2,238,894 | Foster | Apr. 22, 1941 |
| 2,388,576 | Seeley et al. | Nov. 6, 1945 |
| 2,392,672 | Koch | Jan. 8, 1946 |
| 2,611,430 | Elliott | Sept. 23, 1952 |